Figure 1:
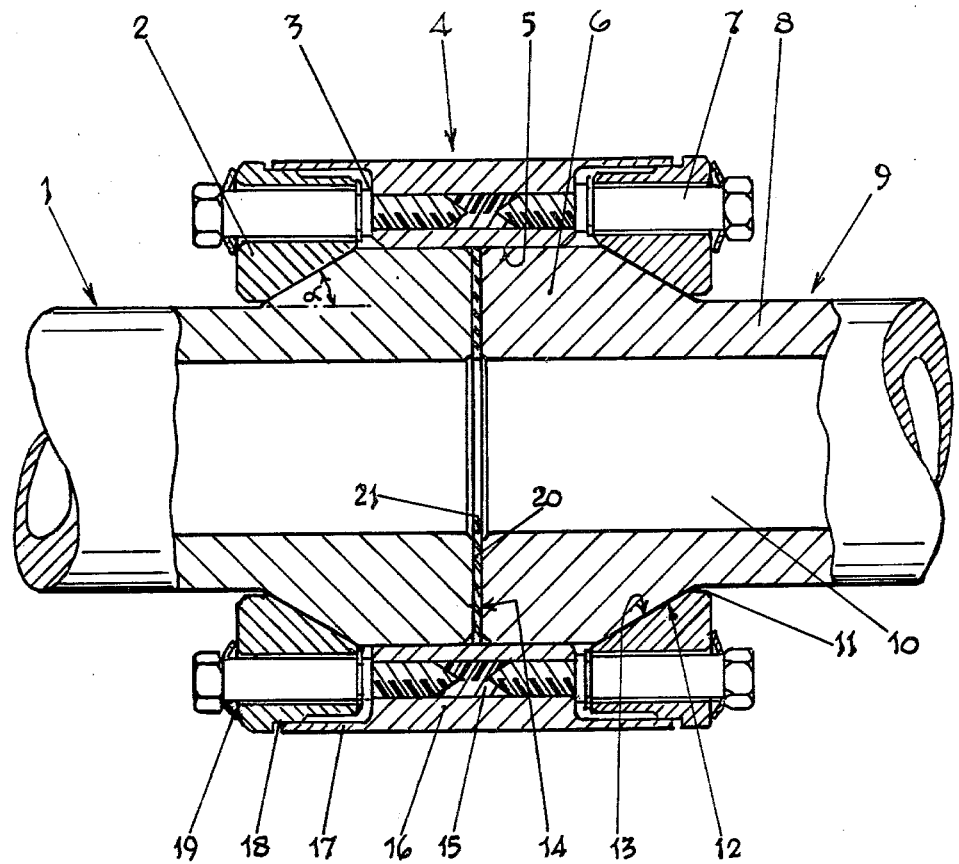

United States Patent [19]

Lee

[11] 4,218,078
[45] Aug. 19, 1980

[54] PIPE CONNECTIONS

[75] Inventor: Alan S. Lee, Leicester, England

[73] Assignee: The English Electric Company Limited, London, England

[21] Appl. No.: 923,387

[22] Filed: Jul. 10, 1978

[30] Foreign Application Priority Data

Jul. 11, 1977 [GB] United Kingdom ............... 29008/77

[51] Int. Cl.² .......................... F16L 5/00; F16L 9/10
[52] U.S. Cl. ................................. 285/115; 285/158; 285/368; 285/369; 285/DIG. 12
[58] Field of Search ............... 285/DIG. 12, 369, 368, 285/115, 423, 158

[56] References Cited

U.S. PATENT DOCUMENTS

| | | | |
|---|---|---|---|
| 218,701 | 8/1879 | Bray | 285/115 |
| 943,461 | 12/1909 | Reynolds | 285/368 X |
| 1,443,051 | 1/1923 | Steindorf | 285/368 |
| 2,606,574 | 8/1952 | Lefebvre | 285/368 X |
| 2,701,731 | 2/1955 | Risley | 285/369 X |
| 3,212,798 | 10/1965 | Lewis et al. | 285/DIG. 12 X |
| 3,393,929 | 7/1968 | Read | 285/423 |
| 3,432,187 | 3/1969 | Mooney et al. | 285/369 X |
| 3,977,709 | 8/1976 | Hatzis | 285/DIG. 12 X |

FOREIGN PATENT DOCUMENTS

| | | | |
|---|---|---|---|
| 1350076 | 12/1963 | France | 285/368 |
| 260884 | 6/1964 | Netherlands | 285/368 |
| 1048008 | 11/1966 | United Kingdom | 285/368 |
| 1169840 | 11/1969 | United Kingdom | 285/DIG. 12 |

*Primary Examiner*—Thomas F. Callaghan
*Attorney, Agent, or Firm*—Kirschstein, Kirschstein, Ottinger & Cobrin

[57] ABSTRACT

A coupling assembly, suitable for connecting pipes made from brittle materials comprises a tubular locating member and several collets securable to the locating member around a pipe. The aperture of the locating member receives the flanged end section of the pipe, and the collets urge the pipe into the aperture and against a co-operating surface of another pipe, held by a further set of collets. Instead of the further set of collets the locating member may have an integral flange to connect the pipe to a tank or pump.

7 Claims, 2 Drawing Figures

PIPE CONNECTIONS

The present invention relates to arrangements for connecting pipes.

In particular, the invention concerns arrangements for connecting pipes made in brittle materials. Such pipes have to be used for the transport of fluids which, on account of their physical and/or chemical properties cannot be conveyed through pipes made from ductile material.

For example, the only known containment materials suitable for the transport of molten aluminium are ceramics, all of which have a small elastic strain range and only a negligible plastic strain range before fracture. High stresses or stress concentrations considerably increase the risk of failure of such materials. Ceramic pipes can be manufactured in only limited lengths and, as they cannot be welded, a means for connecting or joining them is required which creates only low stresses and is free from high stress concentrations. Thus, conventional means such as threaded pipe connections are unsuitable, while simple bolted, flanged connections suffer from the problem of requiring, in order to reduce stress concentrations, wide flanges and large transition radii between the pipe and the flange, these larger flanges and bolt pitch circles in turn increasing the flange bending moments and bolt loads arising from the internal pressure acting on the enlarged pitch circle.

It is an object of the present invention to provide an improved pipe connection producing low stresses whilst at the same time avoiding high stress concentrations.

According to the present invention an arrangement for connecting a pipe at an end-section thereof to at least one further article comprises a coupling assembly incorporating a substantially cylindrical hollow locating member attachable to said further article and arranged to surround said end-section of the pipe, and a plurality of gripping members removably securable to said locating member around the pipe, wherein each of said gripping members has at least one abutment surface adapted to abut in use against a matching contact surface or part thereof near said end-section of the pipe thereby to grip the pipe and urge the end-section towards a co-operating surface of said further article within the hollow locating member, such that a sealing connection is formed between the pipe and said article.

The locating member also serves to position the pipe transversely and to align it with respect to the gripping members and the co-operating surface of said further article.

Preferably the said end-section of the pipe is formed by a flange having a substantially conical back surface which forms the contact surface against which the gripping members abut. In this way a large transition radius between the flange and the adjoining part of the pipe may be incorporated without significantly reducing the width of the contact surface.

Conveniently, the gripping members comprise collets disposed, preferably uniformly, around a circle which is co-axial with respect to the locating member.

The gripping members may be secured to the locating member by means of axially extending bolts, with shouldered bolts in combination with spring means such as disc springs for transmitting the applied load to the gripping means being particularly advantageous, as such an arrangement prevents initial overtightening, and consequent damage, of the pipe coupling.

In a preferred form of pipe coupling the locating member incorporates a thin shell-like annular extension projecting at least partly over the gripping members. This shell-like extension may be axially severed so as to be divided into ring segments acting inwardly on the gripping members in the manner of a series of radially flexible cantilever springs.

The end face of said end-section will frequently abut within the said locating member directly against a corresponding end face of said further article, although in some cases a gasket of a suitable, preferably resilient material may be inserted between these end-faces.

The further article referred to may be another pipe, possibly of the same cross-section and shape, in which case an arrangement in accordance with the present invention will comprise two pipe couplings having a common locating member and separate respective pluralities of gripping members removably secured to the respective side of the common locating member around the respective pipe.

Alternatively, said further article may be some part of a fluid conveying system other than a pipe, such as a tank or a pump, in which case the corresponding part of the coupling member may be of a shape suitable for being secured to said further article, e.g. a flange.

An arrangement in accordance with the invention may form respectively the inlet and/or outlet of a fluid pump.

Some or all of the components of the coupling may be made in metal, nimonic alloy being suitable for forming the locating and gripping members for high temperature applications of the invention.

In a preferred application, an arrangement in accordance with the present invention is used in a fluid conveying system incorporating silicon nitride pipes for conveying molten aluminium.

The invention includes within its scope pumps for pumping molten aluminium incorporating concentric tubes of silicon nitride and means for producing an alternating magnetic field in the gap between the tubes to cause molten aluminium in the gap to be propelled as a result of electric currents induced in the aluminium interacting with the field, and capable of being connected to inlet and outlet pipes as above described.

Figure 2:
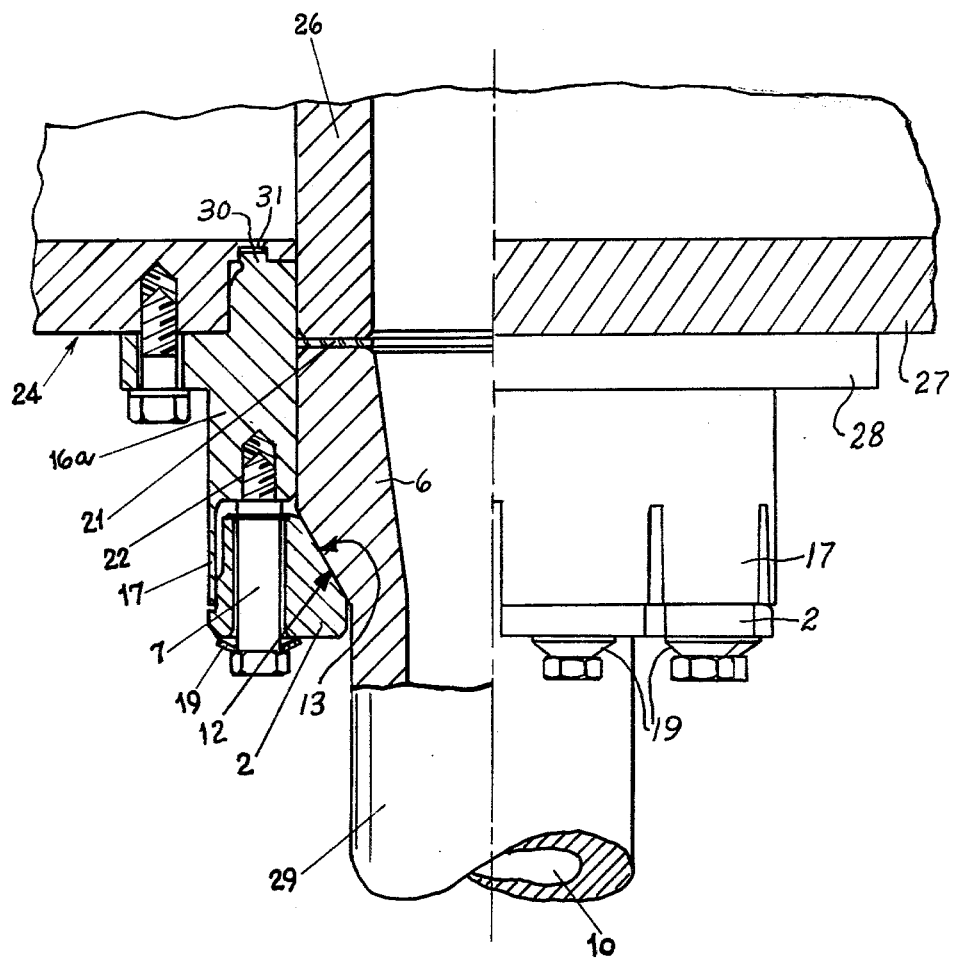

The invention shall be explained further by way of example only and with reference to the accompanying drawings, of which:

FIG. 1 shows a sectional drawing of an arrangement in accordance with the present invention as applied to a pipe joint for two identical pipes, and FIG. 2 illustrates the use of a similar arrangement as applied to the inlet of a fluid pump.

Referring now to FIG. 1, two ceramic pipes 1 and 9, are joined together by means of the metal coupling assembly 4 comprising a hollow cylindrical locating member 16 to which are removably secured by means of shouldered bolts 7 a plurality of metal collets 2 having the form of ring segments. Each of the pipes 1 and 9 has an end-section 6 formed into a flange having a conical back-surface 13 forming the contact surface for the conical inner abutment surfaces 12 of the collets 2. The cylindrical surfaces 5 of the end-sections 6 contact the inner surface of the common locating member 16. This ensures that the end-sections are correctly positioned with respect to the collets 2 and each other to align the respective pipe bores 10.

The locating member 16 incorporates at each end a plurality of axially extending threaded bores 15 into which the bolts 7 are screwed to apply, via springs 19 interposed between the heads of the bolts and the collets 2, the joint closing force to the collets 2 and hence to the respective conical back-surfaces of the end sections 6 of pipes 1 and 9, urging their respective end-faces 14 against each other or, as illustrated, against a gasket 20, forming together the joint face 21.

The springs 19 are of the disc type, as it is possible with this type to provide springs which, when loaded to the correct load have negligible stiffness so that no significant change in load occurs when the temperature of the joint varies and differential expansion takes place between the metal coupling member 4 and the ceramic pipes 1 and 9 respectively.

The bolts 7 are shouldered, so that on being tightened they will abut against the locating member 16 at 3, the load applied by the collets 2 to the contact surfaces 13 then being substantially independent from the initial tightening effort applied.

A further use of the locating member 16 is that, at it is a close fit around the end-sections 6 of the pipes, it restricts the escape of liquid from the connection in the event of any slight accidental separation of the end-faces 14.

Another important feature of the coupling assembly 4 is the shell-like extension 17 projecting from each end of the locating member and forming a thin shell which surrounds and abuts against the outer surfaces 18 of the respective collets 2. In general, the metal components of the coupling assembly 4 have a higher coefficient of expansion than the ceramic pipes 1 and 9 respectively, and therefore no difficulty arises as the pipes 1 and 9 heat up, as in this case the springs 19 merely urge the collets towards the joint face 21, whilst maintaining the closing load. If, however, the temperature decreases, the collets 2 would not normally return to their original positions, if the limiting angle of friction between the collets 2 and the surface 13 is greater than the cone angle $\alpha$, so that contraction of the locating member 16 will cause the collets to bear heavily on the respective pipe, producing an uncontrolled stress. To prevent this, the extensions 17 are axially severed at a number of places so as to be divided into ring segments acting as a series of cantilever springs locating the collets 2 with respect to the pipes 1 and 9 and the locating member 16. Thus, on cooling, the springs 17 deflect radially by a controlled amount thereby limiting the load applied to the collets 2.

Not only does the use of collets 2 distribute the closing load, applied to the surfaces 13 of the flange forming the end-section 6, more evenly than would be the case with the discrete contacts of conventional flange bolts, but using flanges having conical back-surfaces 13 appreciably reduces the stress concentrations at corners 11 as compared to a flat flange, and furthermore permits the use of large transition radii at corners 11 without significantly reducing the width of the available contact surface.

FIG. 2, in which components having the same functions as those illustrated in FIG. 1 carry the same reference numerals, illustrates an application of the present invention to the inlet of a liquid pump.

The pump 24 of which an inlet end is shown in FIG. 2 may, for example, be of the type in which an action is applied to a column of conducting liquid, such as, for instance liquid aluminium, in accordance with the laws of electromagnetic induction by causing an alternating magnetic field to cross the liquid, inducing currents in the liquid which interact with the field to produce a force propelling the liquid forwards.

The tube 26 is, like the pipe 29, manufactured in reaction bonded silicon nitride ceramic. The pipe 29, which is provided externally with a conical end-section 6 similar to those of the pipes 1, 9 of FIG. 1, is attached to the tube 26 of the pump by a connecting arrangement according to the invention. The abutment between the end of the tube 26 and the conical end of tube 29 is via a carbon fibre gasket 21, the pipe 29 being urged towards the tube 26 by the collets 2, made from nimonic alloy. The load is applied to the collets 2 by means of the disc springs 19, compressed by shouldered bolts 7 screwed into blind threaded bores 22 within the locating member 16a, so that the axial load on the joint is always under control as in the case of the pipe joint previously described. Also, the collets 2 are registered by means of extensions 17, where the locating member 16a has been machined into a thin shell which is severed by axial cuts as described above with reference to FIG. 1.

In this second arrangement the locating member 16a is formed with a radial flange 28 which is bolted to the end plate 27 of the pump, is provided at its inner end with an annular extension 30 which is located in a recess 31 of the end plate 27, and provides a support for the adjacent end of the tube 26.

A similar arrangement may also be provided at the outlet end of the pump 24.

We claim:

1. The connection of an end-section of a pipe of brittle material to a further article, wherein said end-section of the pipe is formed with an external diameter larger than the adjoining part of the pipe, and has a conical back surface, said connection including
   (A) a locating member having a cylindrical aperture within which said end-section of the pipe is a sliding fit, and which serves to locate the end-section against transverse movement,
   (B) fastening means for fastening said locating member to said further article,
   (C) a plurality of gripping members each having an inclined abutment surface,
   (D) means for securing the gripping members around the locating member to cause the abutment surfaces to engage co-operating circumferentially spaced regions of said back-surface and urge the end-section of the pipe into the aperture of the locating member, and
   (E) spring means action between the locating member and each of the gripping members such that, with the locating member fastened to said further article, the end face of the pipe is urged resiliently towards a co-operating surface associated with said article and located within said aperture.

2. A connection as claimed in claim 1, wherein the gripping members are in the form of collets disposed uniformly around said aperture of the locating member.

3. A connection as claimed in claim 2 in which the locating member is axially extended by a thin shell-like annular extension projecting at least partly over the gripping members, said extension being axially severed into a plurality of ring segments which act inwardly on the gripping members in the manner of a series of radially flexible cantilever springs.

4. A connection as claimed in claim 1 wherein each of the gripping members has a through-bore adapted to accommodate one of a set of shouldered bolts forming said securing means, and wherein said locating member has a plurality of threaded bores adapted to receive said bolts, and in which said spring means comprises a plurality of disc-springs transmitting the load from each bolt to the respective gripping member.

5. A connection as claimed in claim 4 having an annular sealing gasket of resilient material adapted to be interposed between said end face of the pipe and the co-operating surface of said further article.

6. A connection as claimed in claim 1 between said end-section and an end-section of a further pipe forming said further article, said locating member, and the aperture thereof, being common to both pipes, and the further pipe being similarly secured to the locating member by a further plurality of spring loaded gripping members and associated securing means, the end faces of the pipes being urged resiliently towards each other by the respective gripping members.

7. A connection as claimed in claim 1, wherein said fastening means comprises an annular flange integral with said locating member and adapted to be secured to a substantially flat external wall of said further article, which article also incorporates a tubular member an end-face of which provides said cooperating surface.

* * * * *